United States Patent [19]
LeFort et al.

[11] Patent Number: 4,928,483
[45] Date of Patent: May 29, 1990

[54] AIR TAP AND ENGINE MOUNT FOR A TURBOJET ENGINE

[75] Inventors: Bernard LeFort, Ponthierry; Jean-Pierre Maulat, Saint Maur; Guy R. Pachomoff, Corbeil Essonnes, all of France

[73] Assignee: Societe Nationale d'Etude et de Construction de Moteurs d'Aviation (SNECMA), Evry Cedex, France

[21] Appl. No.: 367,627

[22] Filed: Jun. 19, 1989

[30] Foreign Application Priority Data

Jun. 30, 1988 [FR] France .................. 88 08802

[51] Int. Cl.$^5$ .............................. F02K 3/04
[52] U.S. Cl. .................. 60/226.1; 60/39.07; 60/39.31; 244/54
[58] Field of Search ........... 60/226.1, 39.31, 39.07, 60/262; 244/54

[56] References Cited

U.S. PATENT DOCUMENTS

| 3,777,489 | 12/1973 | Johnson et al. | 60/226.1 |
| 3,779,006 | 12/1973 | Lewis et al. | 60/39.31 |
| 4,044,973 | 8/1977 | Moorehead | 244/54 |
| 4,155,680 | 5/1979 | Linko et al. | 415/144 |
| 4,255,083 | 3/1981 | Andre et al. | 60/226.1 |
| 4,712,370 | 12/1987 | MacGee | 60/30.07 |

FOREIGN PATENT DOCUMENTS

| 2316443 | 1/1977 | France . |
| 2013786 | 8/1979 | United Kingdom . |

*Primary Examiner*—Donald E. Stout
*Attorney, Agent, or Firm*—Bacon & Thomas

[57] ABSTRACT

The present invention provides an air tapping device for tapping a portion of the air passing through the bypass duct of a fan-type turbojet engine. The device is incorporated into the engine mount and is provided with an anti-vibration mounting to minimize the transmission of engine vibrations to the air tapping device. The device is preferably incorporated into the rear engine mount which attaches the engine to the aircraft structure.

9 Claims, 2 Drawing Sheets

AIR TAP AND ENGINE MOUNT FOR A TURBOJET ENGINE

BACKGROUND OF THE INVENTION

The present invention relates to a device for tapping a portion of the bypass air flow of a fan-type turbojet engine incorporated into the engine mount attaching the engine to an aircraft structure.

It is conventional practice to tap a portion of the primary air flow or the bypass air flow to drive auxiliary aircraft equipment or to air condition the cabin of the aircraft. A typical air tap is shown in U.S. Pat. No. 4,044,973 to Moorehead wherein the tubes for the air tapping device extend from the primary engine air flow through the intermediate and outer cowlings, and through the engine support beam.

Such known types of air taps require openings to be formed in the casing through which the tubing passes, thereby rendering the casings weaker and more fragile than those without such openings. Furthermore, the air-tap tubing is subjected to the vibrations of the casings as they pass through the walls and transmit such vibrations to the other portions of the aircraft with which the tubing is connected.

SUMMARY OF THE INVENTION

The present invention provides an air tapping device for tapping a portion of the air passing through the bypass duct of a fan-type turbojet engine. The device is incorporated into the engine mount and is provided with an anti-vibration mounting to minimize the transmission of engine vibrations to the air tapping device. The device is preferably incorporated into the rear engine mount which attaches the engine to the aircraft structure.

The device according to the invention comprises a base plate defining an air tapping orifice, means to attach the plate to an air tapping tube such that the orifice communicates with the interior of the tube, as well as means to attach the base plate to both the engine and the aircraft structure.

DETAILED DESCRIPTION OF THE PREFERRED EMBODIMENT

Figure 1:
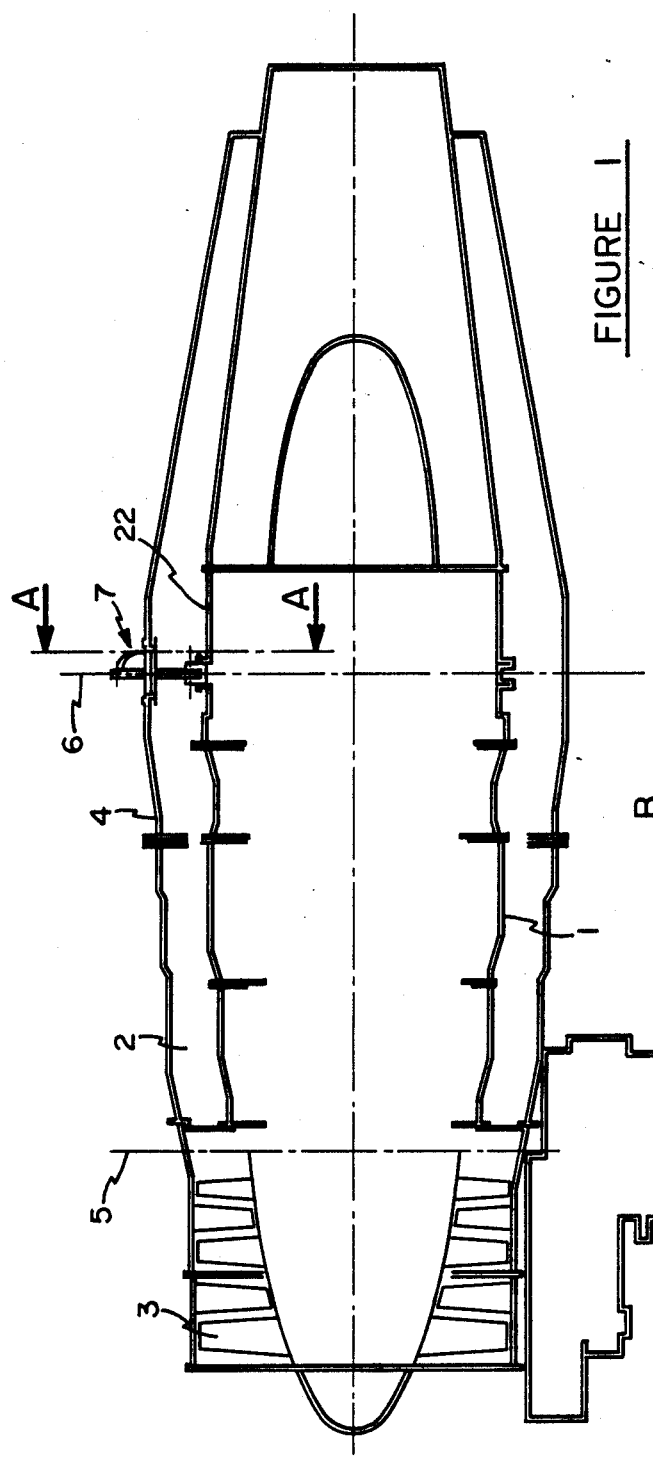
FIG. 1 is a schematic sectional view of a fan-type turbojet engine having a bypass duct surrounding the primary gas flow duct.

FIG. 1 schematically illustrates a cross section of a fan-type turbojet engine wherein the bypass duct surrounds the primary engine structure. The primary flow section, inside the main casing 1, is of known construction and is not shown in further detail. The bypass flow section 2 communicates with the low-pressure compressor 3 located upstream and is bounded by the main casing 1 and the secondary casing 4. The engine is suspended from the aircraft structure by engine mount means located in two planes, a front plane 5 and a rear plane 6.

To provide the requisite pneumatic service to the aircraft and/or to pressurize the aircraft cabin, a portion of the compressed cold air passing through bypass duct 2 is tapped near the plane of the rear engine mount 7. Rather than weakening the secondary casing 4 by providing additional openings for the air-tap, the invention incorporates the air tap into the rear engine mount 7. The engine mount defines an air intake orifice 8 which communicates with the interior of air-tap tube 9.

Figure 2:
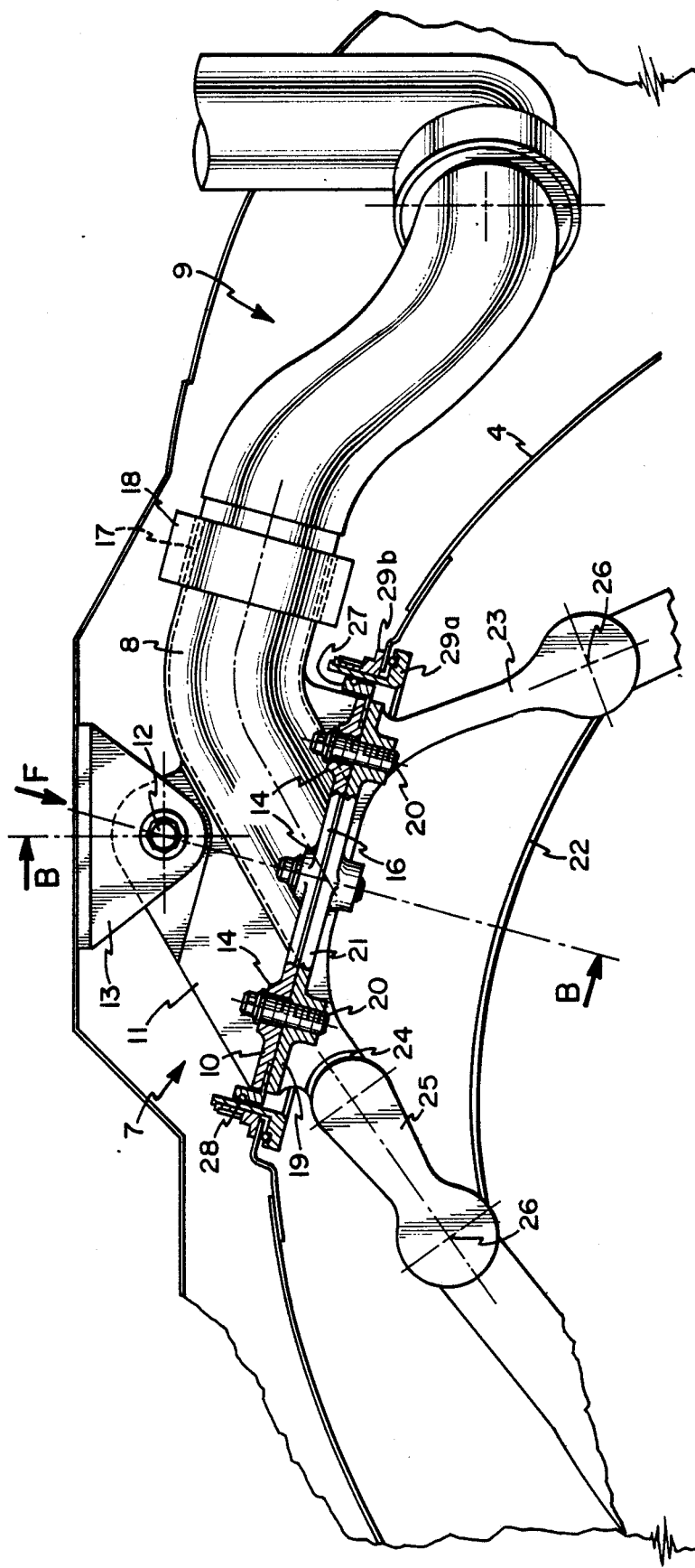
FIG. 2 is an enlarged, partial cross sectional view of the device according to the invention taken along line A—A in FIG. 1.
Figure 4:
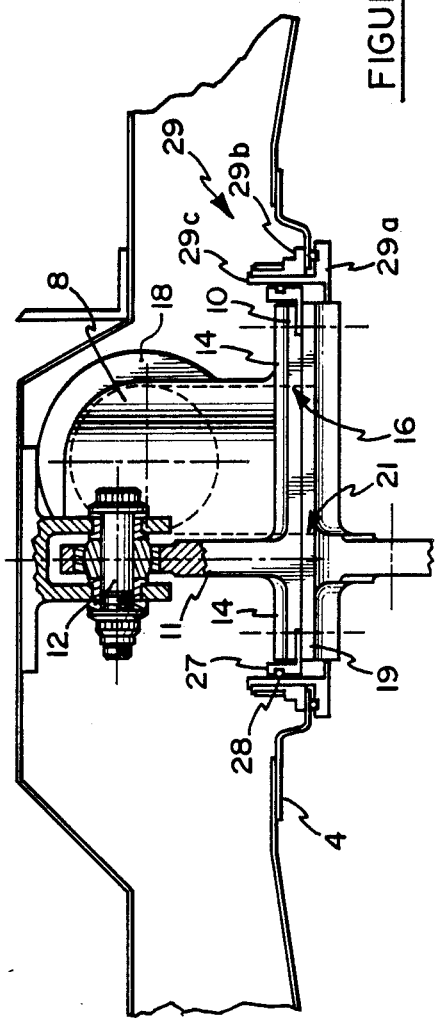
FIG. 4 is a partial, cross sectional view of the device according to the invention taken along line B—B in FIGS. 2 and 3.

As illustrated in FIG. 2, the rear engine mount structure 7 consists of a base plate comprising an external plate 10 having a generally radially extending fitting 11 extending therefrom. The fitting 11 is attached to a bracket 13, fixedly attached to the aircraft structure, by hinge-bearing 12.

Figure 3:
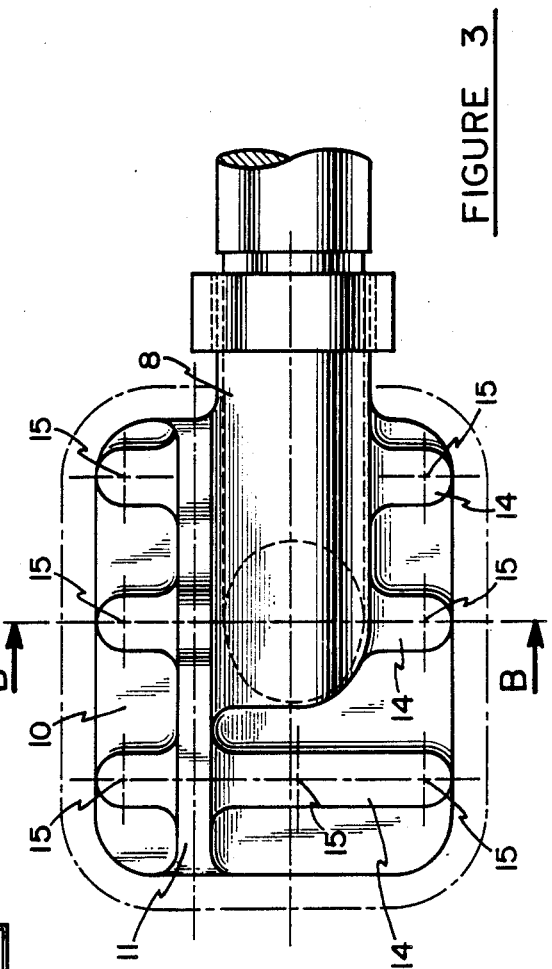
FIG. 3 is an enlarged, partial view taken in the direction of arrow F in FIG. 2.

The external plate 10 has transversely extending bosses 14 extending laterally on either side of the fitting 11, as best seen in FIG. 3. The bosses 14 define slots 15 through which screws or bolts 20 extend and threadingly engage an internal plate 19 in order to affix the internal plate 19 to the external plate 10.

Intake orifice 8 may be integrally formed with the external plate 10 and is located generally tangent to the external fitting 11. The intake orifice 8 may be elbow-shaped and have an external thread formed near its free end 17. Fastening ring 18 threadingly engages the intake orifice 8 as well as an end of the air tap tube 9 to fasten these elements together.

External plate 10 defines aperture 16 which communicates with the interior of the intake orifice 8. Internal plate 19 defines aperture 21, aligned with aperture 16, to enable the air to pass through both the internal and external plates, through the intake orifice and into the interior of the air-tap tube 9.

Internal plate 19 is connected to the exhaust casing portion 22 of the primary engine casing 1 by a plurality of link rods. The link rods may comprise a link rod 23 fixedly attached to, and extending from the internal plate 19 and a second link rod 25 pivotally attached to the internal plate 19 by pivot connection 24. The free ends of the link rods 23 and 25 are attached to the casing 22 at attaching points 26.

The external and internal plates 10 and 19, which constitute the rear engine mount for the engine, further have means to minimize the transmission of vibrations between the secondary casing 4 and the base plate. The plates extend over an opening in casing 4 and are attached to the casing. The interconnection between these elements comprises a circular seal having a first annular ring 27 having a generally "L"-shaped cross section. One of the legs of the "L" shape is clamped between the external plate 10 and the internal plate 19 so as to attach the ring 27 to the base plate.

A second annular ring 29a, also having a generally "L"-shaped cross section, is located concentrically about the ring 27 such that seal element 28, attached to ring 27, slidably bears against the adjacent leg of ring 29a. A third annular ring 29b, also having a generally "L"-shaped cross section, is attached to ring 29a by crimping these elements together as at 29c such that a portion of the wall forming the casing 4 is gripped between adjacent legs of rings 29a and 29b.

The structure is such that the secondary casing 4 may move with respect to the external and internal plates 10 and 19, thereby preventing the transmission of vibrations from the casing to the base plate and the air-tapping tube.

The foregoing description is provided for illustrative purposes only and should not be construed as in any way limiting this invention, the scope of which is defined solely by the appended claims.

We claim:

1. A device for tapping a portion of the air from a bypass duct of fan-type turbojet engine, the bypass duct being defined between a primary engine casing and a secondary casing, and for attaching the turbojet engine to an aircraft structure comprising:
   (a) a base plate extending over an opening defined by the secondary casing, the base plate defining an air tapping orifice;
   (b) means connecting the base plate to an air tapping tube such that the orifice communicates with the interior of the tube;
   (c) first attaching means attaching the base plate to the aircraft structure; and,
   (d) second attaching means attaching the base plate to the primary engine casing.

2. The device according to claim 1 further comprising anti-vibration mounting means mounting the base plate to the secondary casing to minimize the transmission of vibrations from the secondary casing to the base plate.

3. The device according to claim 1 wherein the base plate comprises:
   (a) an external plate defining a first air tapping aperture communicating with the air tapping orifice;
   (b) an internal plate defining a second air tapping aperture aligned with the first air tapping aperture; and,
   (c) means to fasten the internal and external plates together.

4. The device according to claim 3 wherein the first attaching means comprises:
   (a) a generally radially extending fitting extending from the external plate;
   (b) a bracket fixedly attached to the aircraft structure; and,
   (c) pivot means connecting the fitting and the bracket.

5. The device according to claim 4 wherein the second attaching means comprises:
   (a) a plurality of link rods extending from the internal plate;
   (b) means connecting the link rods to the primary engine casing.

6. The device according to claim 5 wherein the plurality of link rods comprises;
   (a) a first link rod fixedly attached to and extending from the internal plate; and,
   (b) a second link rod pivotally attached to the internal plate.

7. The device according to claim 6 further comprising seal means interposed between the base plate and the secondary casing.

8. The device according to claim 7 wherein the seal means comprises:
   (a) a first annular ring having a generally "L" shaped cross-section attached to the base plate;
   (b) a second annular ring having a generally "L" shaped cross-section;
   (c) a seal element located so as to seal between the first and second rings; and,
   (d) a third annular ring having a generally "L" shaped cross-section, the third annular ring attached to the second annular ring so as to grip a portion of the secondary casing therebetween.

9. The device according to claim 8 wherein a portion of the first annular ring is clamped between the internal and external plates.

* * * * *